「United States Patent [19]

Lange et al.

[11] Patent Number: 5,092,948
[45] Date of Patent: Mar. 3, 1992

[54] FIBER REINFORCED LAMINATED CERAMIC COMPOSITES AND METHOD THEREOF

[75] Inventors: Frederick F. Lange, Santa Barbara; David B. Marshall, Thousand Oaks; Craig A. Folsom, Santa Barbara, all of Calif.

[73] Assignee: The Regents of the Univ, of California, Oakland, Calif.

[21] Appl. No.: 292,756

[22] Filed: Jan. 3, 1989

[51] Int. Cl.$^5$ .................................. C03B 29/00
[52] U.S. Cl. ............................ 156/89; 156/306.6; 156/306.9; 428/902
[58] Field of Search ............... 156/306.6, 306.9, 89; 428/282, 902, 294, 284, 408

[56] References Cited

U.S. PATENT DOCUMENTS

| | | | |
|---|---|---|---|
| 3,575,789 | 4/1971 | Siefert et al. | 156/89 |
| 3,946,127 | 3/1976 | Eisenmann et al. | 428/902 |
| 4,065,340 | 12/1977 | Dickerson | 156/306.9 |
| 4,260,657 | 4/1981 | Loyd et al. | 428/902 |
| 4,309,473 | 1/1982 | Minamisawa et al. | 428/902 |
| 4,419,400 | 12/1983 | Hindersinn | 428/902 |
| 4,496,621 | 1/1985 | Hubert et al. | 428/902 |
| 4,767,656 | 8/1988 | Chee et al. | 428/902 |
| 4,820,567 | 4/1989 | Scola et al. | 428/902 |
| 4,874,661 | 10/1989 | Browne | 428/902 |
| 4,888,247 | 12/1989 | Zweben et al. | 428/902 |
| 4,917,938 | 4/1990 | Mohan | 428/902 |
| 4,957,801 | 9/1990 | Maranci et al. | 428/902 |
| 4,961,990 | 10/1990 | Yamada et al. | 428/902 |

OTHER PUBLICATIONS

I. W. Donald and P. W. McMillan, "Review of Ceramic-matrix composites," Journal of Materials Science, 11, (1976) pp. 949-972.
R. A. J. Sambell, et al., "Carbon fibre composites with ceramic and glass matrices, Part 1, Discontinuous fibres," Journal of Material, 7, (1972) pp. 633-675.
R. A. J. Sambell, et al., "Carbon fibre composites with ceramic and glass matrices, Part 2, Continuous fibres," Journal of Materials Science, 7, (1972), pp. 676-681.
J. Aveston, et al., "Fibre reinforced cements-scientific foundations for specifications," Composites-Standard Testing and Design, Apr. 8-9, 1974, pp. 9-16.
A. Kelly, "Some scientific points concerning the mechanics of fibrous composites," Composites-Standards, Testing and Design, Apr. 8-9, 1974.

(List continued on next page.)

Primary Examiner—James J. Bell
Attorney, Agent, or Firm—Phillips, Moore, Lempio & Finley

[57] ABSTRACT

The present invention relates to an article having improved physical properties as compared to the individual components, which article comprises:

a laminated ceramic fiber composite of alternating layers of discrete thin solid sheets of ceramic A having a substantially large upper and lower surface bonded to discrete thin sheets B comprising fibers and having large upper and lower surfaces using a suitable bonding agent. A method is disclosed to produce as laminated fiber-ceramic composite, which comprises:

(a) obtaining discrete preformed thin solid sheets of ceramic A having a substantially large upper and lower surface and thin edge surfaces:

(b) obtaining discrete preformed thin solid sheets B comprising a fiber having large upper and lower surfaces and thin edge surface, wherein the sheet of fibers are either obtained in a matrix of a suitable bonding agent, or a suitable bonding agent is added in amounts effective to bond to the upper and lower surface of the ceramic sheet and to the upper and lower surface of the sheet of fiber;

(c) alternately layering at least two ceramic sheets of step (a) with at least one fiber sheet of step (b) having a minimum A-B-A pattern or in a repeating A-B pattern optionally terminating in a ceramic sheet A; and (d) bonding the laminated sheets of step (c) producing an alternating laminar fiber reinforced ceramic composite. These laminated fiber ceramics are useful in situations involving high impact loads.

19 Claims, 2 Drawing Sheets

OTHER PUBLICATIONS

John J.Brennan, et al. "Silicon carbide fibre reinforced glass-ceramic matrix composites exhibiting high strength and toughness," Journal of Materials Science, 17, (1982) pp. 2371-2383.

D. C. Phillips, "Interfacial bonding and the toughness of carbon fibre reinforced glass and glass-ceramics," Journal Materials Science, 9, (1974), pp. 1847≧1854.

G. A. Cooper, et al., "Multiple Fracture in a Steel Reinforced Epoxy Resin Composite," Journal of Materials Science, 7, (1972), pp. 325-333.

D. B. Marshall, et al., "The Tensile Strength of Uniaxially Reinforced Ceramic Fiber Composites," Fracture Mechanics of Ceramics, vol. 7, (1986), pp. 1-15.

David B. Marshall, et al., "Reliability of Advanced Structural Ceramics and Ceramic Matrix Composites-A Review" Ceramic Bulletin, vol. 66, No. 2, 1987, pp. 309-317.

David B. Marshall, et al. "Measurement of Interfacial Mechanical Properties in Fiber-Reinforced Ceramic Composites," Journal of the American Ceramic Society, vol. 70, No. 8, Aug. 1987, pp. 542-548.

D. B. Marshall, et al., "Tensile Failure of Brittle-Matrix Fiber Composites," Fifth International Conference on Composite Materials, The Metallurigical Society of AIME, San Diego, Calif., Jul. 29-Aug. 1, 1985.

A. G. Evans, et al., "Some Structural Properties of Ceramic Matrix Fiber Composites," Fifth International Conference on Composite Materials, The Metallurgical Society of AIME, San Diego, Calif., Jul. 29-Aug. 1, 1985.

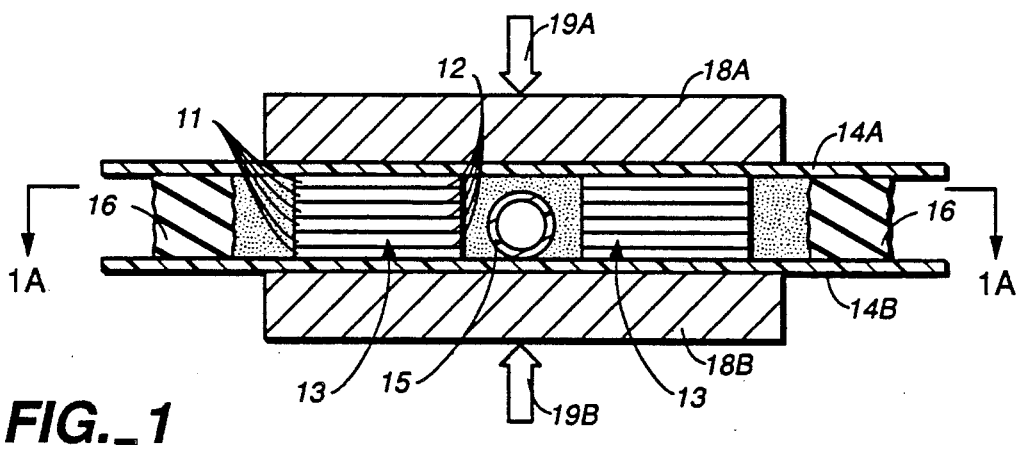
FIG._1
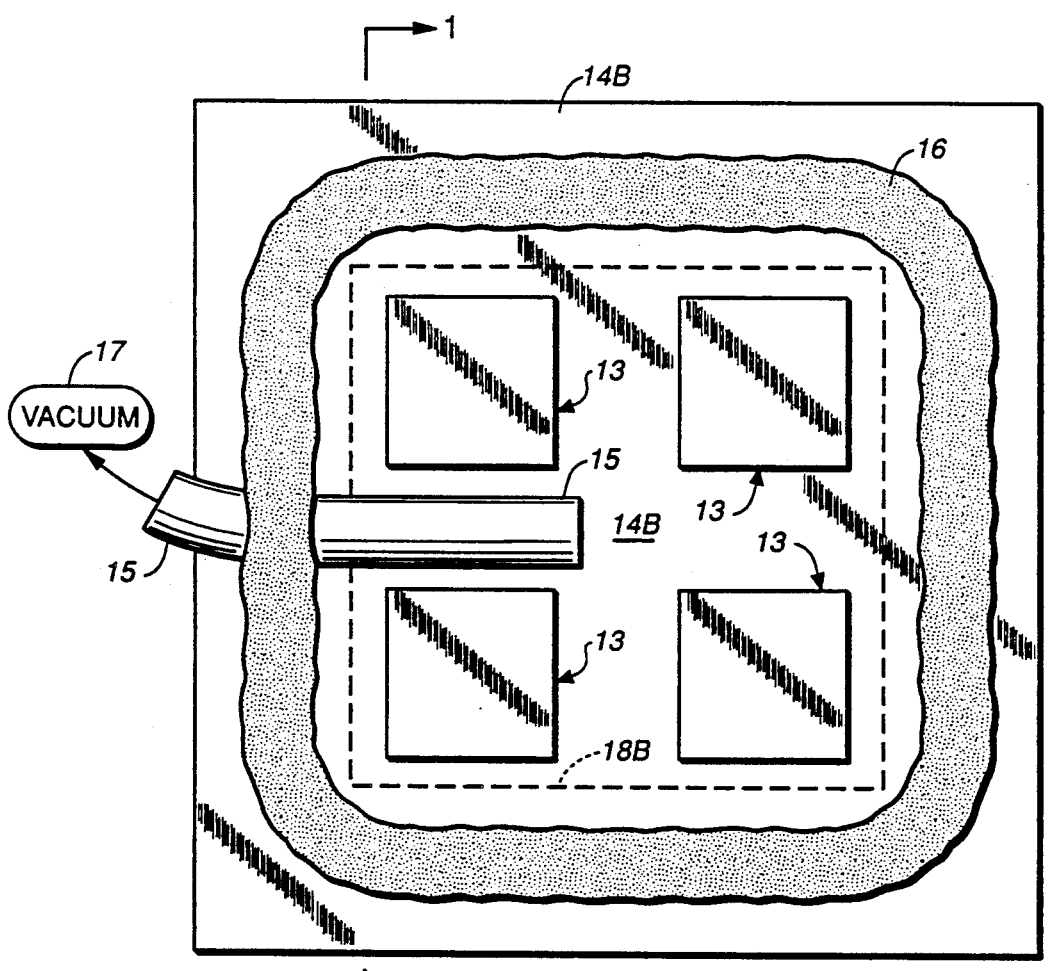
FIG._1A

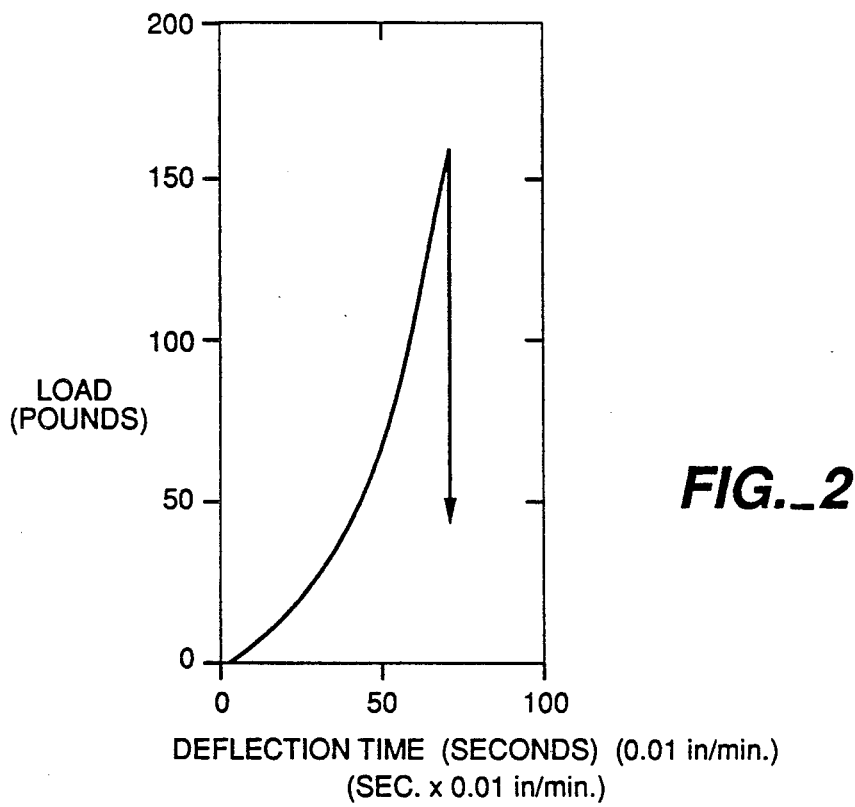
FIG._2
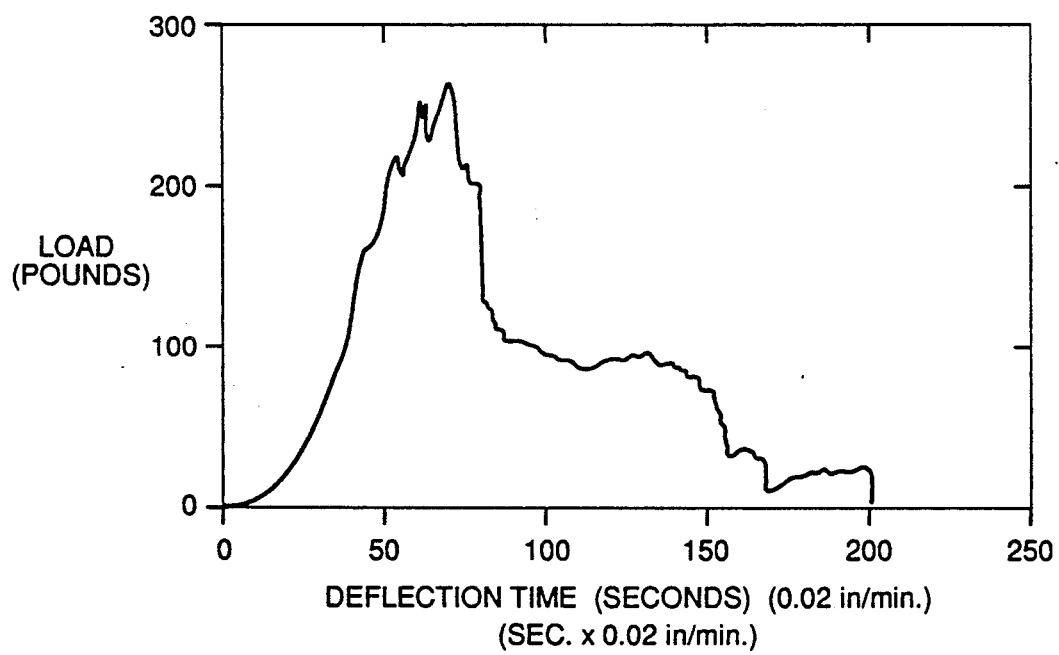
FIG._3

FIBER REINFORCED LAMINATED CERAMIC COMPOSITES AND METHOD THEREOF

BACKGROUND OF THE INVENTION

1. Field of Invention

The present invention relates to a fiber-ceramic laminated composite article and to the method of its production. More specifically the invention relates to a composite of multiple layers of organic or inorganic fibers in an organic, inorganic or metal bonding agent, alternatively bonded to thin sheets of ceramic. The laminated composite articles are useful in situations involving high impact loads and exhibit high strain to failure characteristics.

2. Description of Relevant Art

The field of advanced ceramic composites is summarized by:

D. B. Marshall, et al., *Ceramic Bulletin*, Vol. 66, #2, pp. 309–317; and

I. W. Donald, et al., *Journal of Materials Science*, Vol. 11, pp. 949–972.

Additional references of interest include

R. A. J. Sambell, et al., *Journal of Materials Science*, "Part 1", Vol. 7, pp. 663–675 (1972) and "Part 2", pp. 676–681.

D. B. Marshall, et al., *Journal of American Ceramic Society*, Vol. 70, #8, pp. 542–548 (August 1987)

J. Aveston, et al., "Fibre Reinforced Cements—Scientific Foundations for Specifications," *Composites—Standards, Testing and Design*, (publisher) (date).

A. Kelly, "Some Scientific Points Concerning the Mechanings of Fibrous Composites," *Composites—Standards, Testing and Design*, (publisher) (city) (date)

J. J. Brennan, et al., *Journal of Materials Science*, Vol. 17, pp. 2371–2383 (1982).

D. C. Phillips, *Journal of Materials Science*, Vol. 9, pp. 1847–1854 (1974).

G. A. Cooper, et al., *Journal of Materials Science*, Vol. 7, pp. 325–333 (1972).

All of the references cited in this application are incorporated herein by reference.

The problem historically in the materials arts is to produce light weight composite which performs well in situations involving high impact loads. The present invention provides a solution to this problem.

SUMMARY OF THE INVENTION

The present invention relates to an article having improved physical properties as compared to the individual components, which article comprises:

a laminated ceramic fiber composite of alternating layers of discrete thin solid sheets of ceramic having a substantially large upper and lower surface bonded to discrete thin solid sheets of fiber having a large upper and lower surfaces using a suitable bonding agent.

The present invention also relates to a method to produce a laminated fiber-ceramic composite, which method comprises:

(a) obtaining discrete preformed thin solid sheets of ceramic A having a substantially large upper and lower surface and thin edge surfaces;

(b) obtaining discrete preformed thin solid sheets B comprising a fiber and having large upper and lower surfaces and thin edge surface, wherein the sheet of fibers are either obtained in a matrix of a suitable bonding agent, or a suitable bonding agent is added in amounts effective to bond to the upper and lower surface of the ceramic sheet and to the upper and lower surface of the sheet of fibers;

(c) alternately layering at least two ceramic sheets of step (a) with at least one fiber sheet of step (b) forming a minimum A-B-A pattern or in a repeating A-B pattern; and (d) bonding the laminated sheets of step (c) producing an alternating laminar fiber reinforced ceramic composite.

In a preferred embodiment, in step (c), the repeating A-B- pattern terminates in a ceramic sheet A.

BRIEF DESCRIPTION OF DRAWINGS

FIG. 1 shows a cross-sectional view of the pressing of the laminates to produce the fiber-ceramic composite.

FIG. 1A shows a cut away plan view of the top of the arrangement of FIG. 1.

FIG. 2 is a graph of testing the composite article. It shows the load in pounds versus displacement (deflection in seconds $\times$ 0.01 inches/minute).

FIG. 3 is a graph of the load (in pounds) versus the displacement (deflection in sec. $\times$ 0.02 inch/minutes).

DETAILED DESCRIPTION OF THE INVENTION AND PREFERRED EMBODIMENT

Definitions

As used herein:

"Ceramic powder" includes those inorganic compounds and materials which have or produce on heating ceramic properties. Examples of ceramic powders include, for example, but are not limited to: aluminum oxide, silicon dioxide, mullite, zirconia, silicon nitride, silicon carbide, boron carbide, boron nitride, silicon boride or mixtures thereof. A standard "metal powder" includes those metals or alloys which have or produce on heating metallic properties. Examples of metallic powders, include, for example, but are not limited to: aluminum, nickel titanium, copper, iron, magnesium in the individual pure state alloys or mixtures thereof.

A method is described to make a novel ceramic composite. The method involves bonding together thin ceramic sheets and thin layers of fibers to form a multiple sandwich composite comprising of alternate layers of ceramic and fibers. The thin, strong ceramic sheets are formed by a method used to make ceramic substrates for electronic packaging. The fiber layers can be in the form of either aligned fibers or fibers cloth, which are impregnated with an appropriate bonding agent, e.g., an epoxy resin, a glass powder, a powder of the ceramic itself, etc. The composite is formed by sandwiching the ceramic sheets with fiber layers (previously impregnated with the appropriate bonding agent) and then bonding the ceramic sheets to the fibers layers. Bond is achieved by simply pressing the ceramic sheets and fiber layers together at an appropriate temperature required to produce a strong bond. Laminated composites formed in this manner are very resistant to impact loads and exhibit high strain to failure which is found in other ceramic/fiber composites fabricated with more complex technologies. These laminar ceramic composites are desirable for applications where the attributes of ceramics, e.g., high elastic modulus, wear resistance, etc. and high strain to failure, viz., impact resistance are required.

Thin Ceramic Sheets

Examples of the dense, thin ceramic sheets used in Example 1 to produce the composite are obtained from the Coors Porcelain Co., Golden, Colorado. They are also produced by many other companies for the electronics industry and are used as electrically insulating substrates for a variety of electronic devices.

The thin dense ceramic sheets are also manufactured by mixing a ceramic powder of a desired composition with a variety of polymers and organic solvents to form a pourable slurry. The slurry is poured into a well above a moving plastic sheet attached to a conveyor belt The plastic sheet moves beneath a rectangular opening on one side of the well to form a thin layer of slurry that is carried along the plastic sheet. The desired height of the rectangular opening is controlled by a vertical displacement of one well wall commonly called a "doctor" blade. This vertical opening controls, in part, the thickness of a ceramic slurry released from the well onto the moving plastic sheet. As the thin sheet of slurry is moved with the plastic sheet, solvents within the slurry evaporate leaving behind the ceramic powder and polymer mixture. The mixture drys into a flexible substrate sheet which is easily separated from the plastic sheet as it is wound, for storage, onto a rotating drum at the end of a conveyor belt. The flexible substrate sheet is then cut into desired rectangular shapes, placed on a ceramic plate, and then placed within a furnace. The furnace is first heated to a temperature to pyrolyze the polymer within the flexible substrate sheet, and then heated to a higher temperature to densify the residual ceramic powder into a reasonably strong ceramic substrate. The thickness of the ceramic is controlled by varying the vertical opening from the well, the speed of the plastic sheet, and the volume fraction of ceramic powder within the slurry. This formation of the ceramic sheet is conventional in the art. In addition, prior to firing in a suitable furnace, the flexible substrate sheets are molded to form sheets of relatively complex surface curvature to produce, after firing, any number of ceramic sheets with matching surface curvatures instead of the conventional flat sheets usually produced for electronic substrates. The ceramic sheet has any shape, e.g., square, rectangular, circular, oval, and the like, and has any surface shape or curvature, e.g. portion of a cylinder, portion of a sphere, portion of a oblate spheroid, and the like. The thickness of a ceramic sheet is between about 0.002 inches and 0.125 inches, preferably about 0.025 inches.

The at least one ceramic sheet A is understood to encompass a number of thin ceramic sheets A', A", A'". . . etc., which are bonded to the large surfaces of each other with a compatible bonding agent, usually during the fabrication of the laminer composite.

Thin ceramic sheets of nearly any composition can be formed by this method. Aluminum oxide containing a glass phase is the composition commonly manufactured as substrates for the electronics industry.

Fiber Layers

The orientation of the fibers within the fiber layers is either unidirectional or multi-directional (for example, as produced by weaving a cloth). Fiber layers called "prepregs" are commonly manufactured to fabricate polymer composites by bonding together overlaying "prepreg" layers (e.g. Hexcel Corporation, Dublin, Calif. 94566). The term "prepreg" is derived from the process where the fibers, e.g., in the form of a cloth, are pre-impregnated with a bonding agent, e.g., an epoxy. "Prepregs" are also manufactured containing a glass or ceramic powder which is impregnated into the fiber cloth as a slurry containing the powder and a polymer additive which holds the powder together after the liquid in the slurry is removed by evaporation. The commonly manufactured fiber "prepregs" contain a polymer, e.g., an epoxy bonding agent. The composition of the bonding agent is desired not to react (e.g., cure) until the composite structure is formed. For example, after immediate manufacture, the "prepregs" are frozen and shipped in a frozen state to the composite manufacturer. The composite manufacturer thaws the "prepregs", forms the composite by overlaying the "prepreg"layers and then bonding the layers together by curing the polymer bonding agent at a moderate temperature.

Unlike the fired ceramic sheets, the fiber "prepregs" are substantially flexible and are easily molded, prior to bonding to the ceramic sheets, to match the surface curvature of the ceramic sheets. The moldable property of the fiber "prepregs" allows the fabrication of laminar composites which have complex surface curvatures, e.g., laminar composites which are, for example, a portion of a cylinder, a portion of a sphere, a portion of an oblate spheroid, and the like.

The fiber "prepreg" has any shape and surface curvature to match the shape and curvature of the ceramic sheets. The thickness of the fiber "prepreg" is between about 0.001 inches and 0.02 inches, preferably about 0.005 inches. The volume fraction of fibers within the "prepreg" is between about 0.1 and 0.75, preferably about 0.6. At least one fiber sheet B is understood to also encompass a number of thin sheets B', B", B'" . . . etc., which are bonded to the large surfaces of each other with a compatible bonding agent, usually during the fabrication of the laminar composite. The fiber sheets are unidirectional or multi-directional. It is also contemplated that the fiber sheets be a fabric and that each fiber fabric sheet have parallel or nonparallel fiber directions. Often the fiber fabric are placed at 90 degree orientations to each other in a laminate. Further, sheets of fiber of different compositions are also used to achieve desired physical and chemical properties.

Although strong carbon fibers are generally used by industry to manufacture fiber "prepregs", "prepregs" are manufactured with any strong organic, inorganic or combination of different fibers.

In one embodiment the fiber is selected from KEVLAR ® which is an aromatic polyamide, NICALON ®, silicon carbide (SiC), graphite, aluminum oxide, zirconium oxide, boron, carbon, or combinations thereof. KEVLAR ® is a trademark of DuPont, Wilmington, Del.

Forming a Laminar Ceramic Composite

Referring now to FIGS. 1 and IA, the fiberous "prepregs" B (12) are sandwiched between the thin ceramic sheets 11 to form a multiple, layered stack 13 where the outer two layers A (or 11) of this stack 13 are ceramic sheets A (or 11). This layered stack is placed between the plates of a press (18A or 18B) and loaded to an appropriate pressure 19A and 19B to produce intimate contact between adjacent ceramic sheets and fiber "prepregs" within the stack. The pressed stack 13 is then heated to a desired temperature to bond the "prepregs" to the ceramic sheets. A vacuum 17 is optionally useful to remove gases. More experimental detail is provided in the Examples below.

It is apparent that many different laminar ceramic composites can be made by the present invention, e.g.:

Ceramic laminar composites fabricated by the same manner described herein where the fibers within the "prepreg" are not unidirectional, but multidirectional so that the composite will exhibit high strain to failure under biaxial loading conditions.

Ceramic laminar composites fabricated by the same manner described herein where the fibers within the "prepreg" are not graphite, but some other strong fiber such as Kevlar.

Ceramic laminar composites fabricated with a similar method described herein where the bonding agent in the fiber "prepreg" is a glass powder. With a glass bonding agent, the evacuation of air from within the composite prior bonding is not needed and the temperature where bonding achieved is higher (e.g., between 400° C. and 1400° C. With a glass bonding agent, strong, refractory fibers such as SiC, Al2O3, etc. are required.

Ceramic laminar composites fabricated with a similar method described herein where the bonding agent in the fiber "prepreg" is a ceramic powder with a composition either identical to or different from that of the thin ceramic sheets. With a ceramic bonding agent, the evacuation of air from within the composite prior to bonding is not needed and the temperature where bonding achieved is higher (e.g., between 1000° C. and 2000° C.). With a ceramic powder bonding agent, strong, refractory fibers such as SiC, Al2O3, etc. are required. In addition, the bonding agent can be a metal powder. Herein, the fiber layer is impregnated with either a molten metal or a metal powder.

Ceramic laminar composites are fabricated with a similar method described herein except that the thin ceramic sheets are not aluminum oxide, but a ceramic of some other composition. Transformation toughened compositions based on zirconium oxide produce a much higher strength ceramic sheet relative to aluminum oxide and thus a higher strength laminar composite. Lower density compositions such as boron carbide make excellent laminar ceramic composites for other uses.

Ceramic laminar composites are fabricated to contain a volume fraction of fibers between 0.03 and 0.40. Different composites containing the same ceramic, fiber and bonding agent but containing the different volume fractions of fibers are fabricated between 0.03 and 0.40. Different composites the same ceramic, fiber and bonding agent but containing the different volume fractions of fibers are fabricated by using different thicknesses of the ceramic sheet, different thicknesses of fiber sheet, and by using different volume fractions of fiber, relative to the bonding agent, within the fiber sheet.

Examples of ceramic powders and ceramic materials are also referenced in "Processing of Crystalline Ceramics, Materials Science Research Vol. 11, Ed. by H. Palmour III, R. F. Davis and T. M. Hare, Plenum Press, New York, N.Y., which is incorporated herein by reference.

Suitable examples of ceramic powders are also found in Table 1 below.

TABLE 1

CERAMIC MATERIALS

| Metal Base | Carbides | Nitrides | Borides | Oxides | Applications |
| --- | --- | --- | --- | --- | --- |
| Boron | B4C | BN | | | Aerospace |
| Tantalum | TaC | TaN | TaB2 | | Aerospace |
| Zirconium | ZrC | ZrN | ZrB2 | ZrO2 | Aerospace |
| | | | | ZrO2 | Automotive |
| | | | | (T) | Nuclear |
| Hafnium | HfC | HfN | HfB | HfO2 | Aero, Neuc |
| Aluminum | | AlN | | Al2O3 | Automotive |
| | | | | | Nuclear |
| Silicon | SiC | Si3N4 | | | Aerospace |
| | | | | | Automotive |
| Titanium | TiC | TiN | TiB2 | | Aerospace |
| Chromium | CrC | | CrB2 | Cr2O3 | Aerospace |
| | | | | | Automotive |
| Molybdenum | MoC | | MoB | | Aerospace |
| | | | | | Automotive |
| Tungsten | WC | | WB | | |
| Thorium | ThC2 | ThN | | ThO2 | Aerospace |

Silicides: NbSi, FeSi etc.

Metal Bonding Agents

It is also possible to bond the ceramic sheet to the prepreg to produce a laminate. In this embodiment the ceramic and prepreg are combined with a suitable heat and pressure to cause melting of the metal powder. After application of heat and pressure for an appropriate time, the temperature is decreased and pressure is removed, and the laminated metal bonded ceramic prepreg composite is obtained.

Preferably the ceramic/prepreg pre-composite is heated to minimize thermal shock, at temperatures greater than the melting point of the metal, see Table 2. For example, when the ceramic is alumina, it is heated to about 700° C., and aluminum powder becomes molten aluminum at about 650° C. is used to bond the ceramic and the prepreg.

TABLE 2

Metal Reinforcement Materials and Approximate Heat Treatment Temperatures Needed to Optimize Strength and Deformation Characteristics

| Metal | Max. Melting Temp., °C. | ANNEALING Approx. Heat Treat. Temp., °C. |
| --- | --- | --- |
| Al and Al alloys | 650 | 450 |
| Mg and Mg alloys | 627 | 200–500 |
| Pb and Pb alloys | 326 | 200–300 |
| Cu and Cu alloys | 1080 | 700 |
| Ti and Ti alloys | 1660 | 500–700 |
| Al—Ti Superalloys | 1450 | 750 |
| Nickel Base Superalloys | 1450 | 750 |
| Cobalt Base Superalloys | 1450 | 750 |
| Iron Base Superalloys | 1200 | 750 |
| Zirconium Alloys | 1400 | 600 |

In a preferred embodiment, the ceramic A is selected from alumina, silica, zirconia or mixtures thereof In a preferred embodiment, the repeating ceramic laminate A-B- is alumina-graphite-alumina-graphite-alumina-graphite-alumina.

In a preferred embodiment, the repeating ceramic laminate A-B- comprises a ceramic A of an alumina/zirconia and a fiber B of graphite having an epoxy bonding agent.

In a preferred embodiment, the composite has a repeating A-B- pattern of between about 5 and 50 total layers.

The following Examples are provided to be descriptive and explanatory only. They are not to be construed as being limiting in any way.

GENERAL EXAMPLE 1

LAMINAR COMPOSITE FABRICATION

Again, referring to FIGS. 1 and 1A, thin, square (0.025 by 2 by 2 inches) aluminum oxide substrates are obtained from the Coors Porcelain Co., Golden, Colo. A sheet of unidirectional graphite fiber/epoxy "prepreg", 12, 0.005 inch thick, is obtained from the Fiberite Corporation, an ICI Company, 501 West Third Street, Winoma, Minn. 55987. After thawing, the "prepreg" sheet is sticky and flexible. It is easily cut into 2 inch squares. The epoxy within the "prepreg" is reported by Fiberite to have a shelf life of approximately 10 days at room temperature. Composite specimens 13 are fabricated by stacking together alternate layers of ceramic sheets 11 and fiber "prepregs" 12. The orientation of the fibers within each "prepreg" layer is identical within each specimen Each two inch square specimen contains 6 ceramic sheets 11 and 5 "prepreg" layers 12.

After forming a sufficient number of specimens 13, a group of 4 specimens are placed on top of a thin (0.005 inch) sheet of Kapton 14B (a high temperature polymer manufactured by DuPont). A small length of plastic tube 15 is placed on the Kapton sheet, perpendicular to its edge. A bead of silicon rubber sealant 16 is extruded around the edge of the Kapton sheet 14B, and another Kapton sheet 14A is placed on top of the sealant 16 to form a container containing the four specimens. The purpose of this container is to allow gases to be removed through plastic tube 15 from between the ceramic/"prepreg" layers with a vacuum 17 (water aspirator mechanical pump).

After curing the silicon rubber sealant, air is withdrawn from the bag by attaching the plastic tube extending from the bag to a vacuum system. The bag containing the specimens is placed between two steel plates (8A and 18B), and then between the rams of a Carver Laboratory Press, Fred S. Carver, Inc., a subsidiary of Sterling, Inc., W142 N9050 Fountain Boulevard, Menomonee Falls, Wisc. 53051, as schematically shown in FIG. 1. A force of 2000 pounds 19A and 19B is applied to each opposing steel plate to produce a compressive pressure of approximately 125 psi across each of the four specimens. Steel plates 19A and 19B are subsequently heated to approximately 275° F. The specimens are held at this pressure and temperature for approximately 90 minutes. This temperature-time period is recommended by the Fiberite Corp. for curing the epoxy bonding agent. The specimens are then cooled to room temperature and removed from the Kapton container.

(b) The procedure of Example 1(a) above is followed with the following changes, the ceramic aluminum oxide (alumina) replaced with a mixture of alumina/zirconia, and the graphite and epoxy are the same. A useful laminated composite is obtained.

EXAMPLE 2

Mechanical Testing

One testing method is simply to try to fracture the square composite specimens with a ballpeen hammer. With this method, two edges of square specimen are supported by metal plates to produce an unsupported length of approximately 1.5 inches. The specimen is then impacted close to its center with the spherical end of a ballpeen hammer. When the specimen is oriented such that the fibers within the specimen are parallel to the supported edges, the specimen fractures during the first impact The crack path in such a fracture is approximately parallel to the fiber direction. When the specimen is oriented such that the fibers within the specimen are perpendicular to the supported edges, the specimen bounces off the supports after the initial impact. Examination of the impacted area shows that the ceramic sheet is impacted with the hammer contained a ring crack or multiple ring cracks commonly observed when a spherical impact is made on a brittle material. Although the impact did damage the specimen, it did not produce failure, i.e., neglecting the ring crack in the top ceramic substrate, the specimen appears the same as it did before impact. In this orientation, repeated impacts, of similar magnitude, are required to fracture the specimen. After multiple impacts, but before complete failure, it is observed that most of the ceramic sheets within the specimen are cracked, and the fiber layers are holding the specimen together. When the specimen does fail into two or more pieces, the fiber layers protrude from between the ceramic sheets This observation is indicative a laminated composite that exhibits high strain to failure.

EXAMPLE 3

Flexural Loading Jig

Bar specimens (approximate dimensions: thickness of composite (approximately 0.25 inches) by 0.25 inches by 2 inches) are cut with a diamond saw from the square composite specimens. One set of specimens are cut such that the fibers are parallel to the bar length, and one set of specimens are cut such that the fibers are perpendicular to the bar length. Both types of specimens are tested in a four point flexural loading jig with an instrumented mechanical testing machine.

FIG. 2 shows the load vs. displacement behavior typical for specimens with fibers perpendicular to the bar length. This figure shows that this type of specimen fails in a manner typical of an unreinforced brittle material. Namely, the load increases to a maximum value and then drops catastrophically when the specimen fails (about 150 pounds). FIG. 3 shows the load vs displacement behavior typical for specimens with fibers parallel to the bar length. FIG. 3 shows that the failure is not catastrophic, but that high strains must be applied to cause failure. This behavior is similar to that observed for other high strain to failure composite materials in which the fibers bridge the extending crack within the ceramic component of the composite.

EXAMPLE 4

Laminated Composite Using A Metal Bonding Agent (A) A large sheet of graphite thin fiber, woven cloth (Fiberite and Hexcel) is impregnated with a slurry of copper particles and dried. The impregnated cloth is cut into 2 inch squares. Composite specimens are fabricated by stacking together alternate layers of the aluminum oxide substrates (0.025 by 2 by 2 inches) obtained from the Coors Porcelain Co., Golden Colo. Each two inch square specimen contains 8 ceramic sheets and 7 fiber sheets. After forming a specimen, it is placed between the rams of a vacuum hot press and heated to 1150° C. in a vacuum of 1 torr. A load is then exerted on the specimen by the opposing rams to produce a compressive stress within the specimen 500 pounds per square inch. This pressure and temperature is maintained for a period of 10 minutes. The specimen is then cooled, under stress, to room temperature and removed from the hot press. A laminated composite of graphic cloth and ceramic bonded with copper is obtained.

(b) The procedure is repeated except that the copper powder is replaced with aluminum powder and the composite is heated to 700° C. The corresponding laminated composite of graphite cloth/ceramic is obtained and bonded with aluminum.

While only a few embodiments of the invention have been shown and described herein, it will become apparent to those skilled in the art that various modifications and changes can be made in the laminated fiber-ceramic composite article and the method to produce the composite article without departing from the spirit and scope of the present invention. All such modifications and changes coming with the scope of the appended claims are intended to be carried out thereby.

We claim:

1. A method to produce a bonded laminated fiber-ceramic composite, which method comprises:
    (a) obtaining preformed thin solid sheets of a ceramic A having a large upper surface, a large lower surface and thin edges;
    (b) obtaining preformed thin solid sheets B comprising fibers and having a large upper surface and a large lower surface and thin edges, wherein the sheet of fibers is either obtained in a matrix of a suitable bonding agent, or a suitable bonding agent is added in amounts effective to bond the large upper surface and the large lower surface of the ceramic sheet A and to the upper large surface and lower large surface of the sheet of fiber B;
    (c) alternately layering the large flat surfaces of at least two ceramic sheets A of step (a) with the flat surface of at least one fiber sheet B of step (b) for a minimum A-B-A pattern or in a repeating A-B- pattern; and
    (d) bonding together the large flat surfaces of the laminated sheets of step (c) producing an alternating laminar fiber reinforced ceramic composite.

2. The method of claim 1 wherein the step (d) the produced composite has improved resistance to impact loads and improved high strain to failure properties.

3. The method of claim 2 wherein in the composite of step (d) the fiber layer is unidirectional.

4. The method of claim 2 wherein in the composite of step (d) the fiber layer is multidirectional.

5. The method of claim 1 wherein in step (b) the bonding agent is an inorganic bonding agent selected from glass, silica, ceramic powder, metal powder or mixtures thereof.

6. The method of claim 1 wherein in step (b) the bonding agent is a organic bonding agent selected from urethane, epoxy, polyethylene, polyester, polyamide or mixtures thereof.

7. The method of claim 1 wherein the fiber is selected from glass, an aromatic polyamide, NICALON ®, silicon carbide, graphite, aluminum oxide, zirconium oxide, carbon, or combinations thereof.

8. The method of claim 1 wherein in step (d) the bonding is conducted by subjecting the laminate to a pressure of between about 100 and 5,000 lbs. per square inch, at a temperature of between about 50° and 1700° C., in a vacuum of between about 750 and 1 torr for a time of between 0.1 and 10 hr.

9. The method of claim 1 wherein
    the ceramic of step (a) is selected from silica, magnesia, titania, zirconia, boron carbide, alumina, silicon carbide, silicon nitride, mullite, or mixtures thereof;
    in step (b) the fiber is an inorganic fiber or graphite fiber, and the bonding agent is an inorganic bonding agent; and
    in step (d) the pressure is between about 1000 and 5000 pounds per square inch and the temperature is between 700° and 1700° C.

10. The method of claim 1 wherein:
    in step (a) the ceramic is selected from silica, magnesia, titania, zirconia, boron carbide, alumina, silicon carbide, silicon nitride, mullite, or mixtures thereof;
    in step (b) the fiber is an organic fiber, and the bonding agent is an organic bonding agent; and
    in step (d) the pressure on the laminate is between about 100 and 4000 pounds per square inch, and the temperature is between about 50° and 600° C.

11. The method of claim 1 wherein the bonding agent is a metal or metal alloy.

12. The method of claim 1 wherein the bonding agent is a ceramic powder.

13. The method of claim 5 wherein the bonding agent is selected from a metal or metal alloy.

14. The method of claim 5 wherein the bonding agent is a ceramic powder.

15. The method of claim 1 wherein in step (c) the repeating A-B- pattern terminates in a ceramic sheet A.

16. The method of claim 1 wherein the ceramic A is selected from alumina, silica, zirconia or mixtures thereof.

17. The method of claim 1 wherein the repeating ceramic laminate A-B- is alumina-graphite.

18. The method of claim 1 wherein the repeating ceramic laminate A-B- comprises a ceramic A of an alumina/zirconia mixture and a fiber B of a graphite cloth using an epoxy bonding agent.

19. The method of claim 1 wherein the composite has a repeating A-B- pattern having between about 5 and 50 total layers of ceramic and fiber.

* * * * *

UNITED STATES PATENT AND TRADEMARK OFFICE
CERTIFICATE OF CORRECTION

PATENT NO. : 5,092,948
DATED : March 3, 1992
INVENTOR(S) : Lange, et al.

It is certified that error appears in the above-identified patent and that said Letters Patent is hereby corrected as shown below:

Column 1, between lines 3 and 4 please insert

This invention was made with Government support under contract N00014-85-K-0883 awarded by the Dept. of Navy.
The Government has certain rights in this invention.--

Signed and Sealed this

Fourteenth Day of December, 1993

Attest:

BRUCE LEHMAN

Attesting Officer

Commissioner of Patents and Trademarks